(12) United States Patent
Imai

(10) Patent No.: US 8,743,422 B2
(45) Date of Patent: Jun. 3, 2014

(54) IMAGE PROCESSING APPARATUS, IMAGE PROCESSING METHOD, IMAGE PROCESSING PROGRAM AND PRINTING DEVICE

(75) Inventor: Toshie Imai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 13/423,484

(22) Filed: Mar. 19, 2012

(65) Prior Publication Data

US 2012/0236366 A1  Sep. 20, 2012

(30) Foreign Application Priority Data

Mar. 18, 2011  (JP) .................. 2011-061311

(51) Int. Cl.
*G06K 15/02* (2006.01)
*G06K 9/00* (2006.01)
*G06K 9/46* (2006.01)

(52) U.S. Cl.
USPC ............ 358/2.1; 382/162; 382/166; 382/232; 382/233

(58) Field of Classification Search
USPC ................... 358/2.1; 382/166, 162, 232, 233
See application file for complete search history.

(56) References Cited

U.S. PATENT DOCUMENTS 7,386,168 B2 * 6/2008 Misawa .................. 382/166

FOREIGN PATENT DOCUMENTS

JP  11-203007 A  7/1999

* cited by examiner

*Primary Examiner* — Charlotte M Baker
(74) *Attorney, Agent, or Firm* — Nutter McClennen & Fish LLP; John J. Penny, Jr.

(57) ABSTRACT

An image processing apparatus includes an area specifying unit for specifying a text area including a text with an achromatic color and a background with an achromatic color, in an image to be output; an inversion processing unit for inverting the brightness of achromatic colors only for the specified text area; and an output unit for outputting an image including the text area where the brightness of achromatic colors is inverted. With respect to a gray-level achromatic color configuring a text in the specified text area, the inversion processing unit changes the color to be brighter than the case where the brightness is inverted.

11 Claims, 9 Drawing Sheets

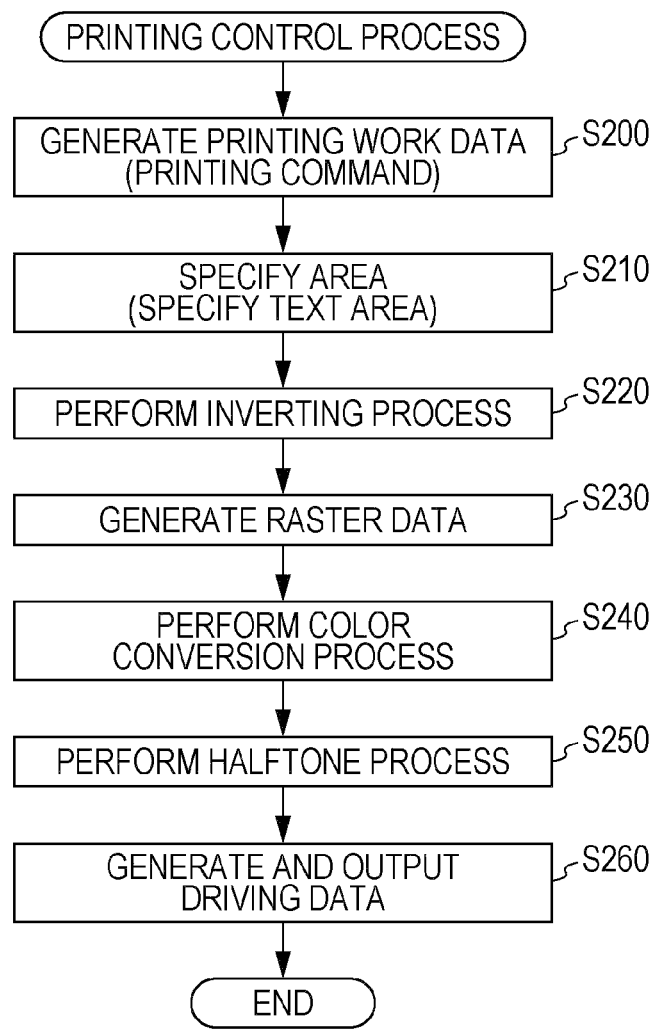

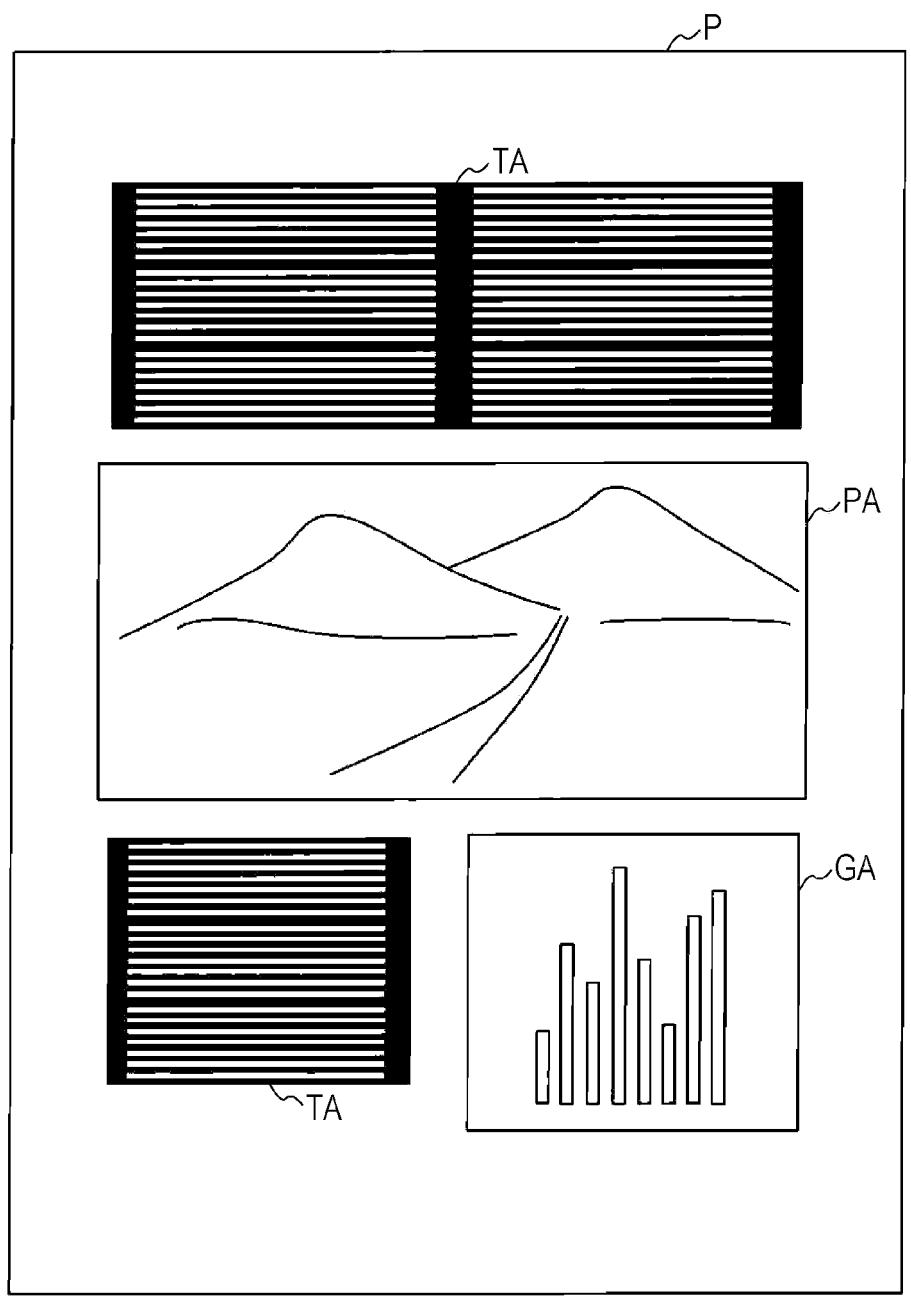

FIG. 5
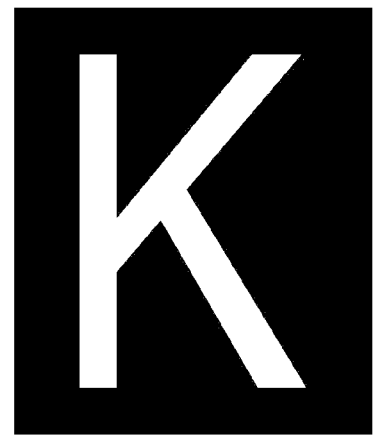
⇩ PARTIAL ENLARGEMENT
NOT CORRECT BRIGHTNESS OF HALFTONE
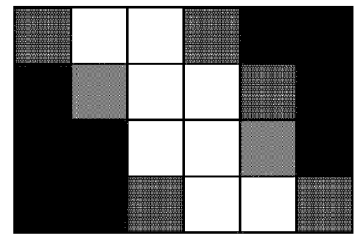
⇩
CORRECT BRIGHTNESS OF HALFTONE
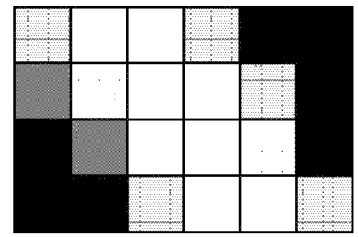

IMAGE PROCESSING APPARATUS, IMAGE PROCESSING METHOD, IMAGE PROCESSING PROGRAM AND PRINTING DEVICE

BACKGROUND

1. Technical Field

The present invention relates to an image processing apparatus, an image processing method, an image processing program and a printing device.

2. Related Art

An image forming device for switching between a general state where data is displayed with two colors of black and white in a display screen and a white/black inverted state where a white display area in the general state is displayed in black and a black display area in the general state is displayed in white is known in the art as a technique for inverting colors in an image (see JP-A-11-203007).

It is known that inverting the white (background) and black (text) in an image decreases the burden on the eyes (eye fatigue) of a user who reads the text on the image. However, if color inversion is performed, the original image is changed so largely that the value of the image may greatly deteriorate (the image may become a substantially deteriorated image, undesirably). In addition, just simple inversion of colors may not accurately ensure convenient viewing (easy reading).

SUMMARY

An advantage of some aspects of the invention is to provide an image processing apparatus, an image processing method, an image processing program and a printing device, which may provide an easily visible image by reducing the burden on the eyes of a user and preventing the image from deteriorating.

According to an aspect of the invention, there is provided an image processing apparatus, which includes an area specifying unit for specifying a text area including a text with an achromatic color and a background with an achromatic color, in an image to be output; an inversion processing unit for inverting the brightness of achromatic colors only for the specified text area; and an output unit for outputting an image including the text area where the brightness of achromatic colors is inverted.

According to the present invention, with respect to an image to be output, only the brightness of achromatic colors in the text area is inverted. In other words, in the corresponding image, the text displayed in black in the text area is displayed in white and the background displayed in white in the text area is displayed in black, which decreases the burden on the eyes of a user who reads the text. In addition, with respect to an area other than the text area of the corresponding image or a color (chromatic color) other than the achromatic color in the text area, there is no color change, and so the change of the image is suppressed to the minimum as a whole, thereby preventing the image from deteriorating.

According to an embodiment of the present invention, with respect to a gray-level achromatic color configuring a text in the specified text area, the inversion processing unit may change the color to be brighter than the case where the brightness is inverted.

In the corresponding configuration, for the image, for example, with respect to a portion (a gray portion) to which a text anti-aliasing process is performed, it is possible to prevent the text after inversion from looking thinner in appearance, since the gray portion becomes brighter than the case where the brightness is simply inverted after the process of the inversion processing unit is performed.

According to an embodiment of the present disclosure, the output unit may print an image including the text area where the brightness of achromatic colors is inverted and an image including a text area before the brightness of achromatic colors is inverted, on a single printing medium.

In the corresponding configuration, since an image including the text area after inversion and an image with no color inversion are printed on a single printing medium, a user may comfortably read the text area by viewing the print result and also recognize the original color of the entire image.

According to an embodiment of the present disclosure, in the case where an image including the text area where the brightness of achromatic colors is inverted and an image including a text area before the brightness of achromatic colors is inverted are printed on the same surface of a single printing medium, the output unit may print only the text area as the image including the text area where the brightness of achromatic colors is inverted.

In the corresponding configuration, among two images printed side by side on the same surface of the printing medium, the other image is not printed for locations other than the text area (since they are entirely identical). For this reason, it is possible to suppress the consumption of recording material (ink or toner) and reduce the time required for printing without cutting the information to be provided to the user.

According to an embodiment of the present disclosure, the output unit may print an image including the text area where the brightness of achromatic colors is inverted and an image including a text area before the brightness of achromatic colors is inverted, on one surface and the other surface of a single printing medium. In other words, the image including the text area after inversion and the image with no color inversion may be printed on both sides of a printing medium.

The technical ideas according to the present invention may be implemented in various ways in addition to the image processing apparatus. For example, a method invention having each processing step performed by each component of the image processing apparatus (an image processing method) or a program invention executing a corresponding function of each component using predetermined hardware (a computer) (image processing program) may be conceived. In addition, the image processing apparatus may be included in any device (a printing device or a printing control device). In addition, the above apparatus and method may be implemented by a single device or a plurality of devices. In addition, the printing device is a device having at least a printing function, and it may be a composite device having various functions in addition to the printing function.

BRIEF DESCRIPTION OF THE DRAWINGS

The invention will be described with reference to the accompanying drawings, wherein like numbers reference like elements.

FIG. 2 is a flowchart for illustrating processes according to the first embodiment.

FIG. 4 is a diagram exemplarily showing a printing result.

FIG. 5 is a diagram exemplarily showing a part of a text area or the like in the printing result.

DESCRIPTION OF EXEMPLARY EMBODIMENTS

Figure 1:
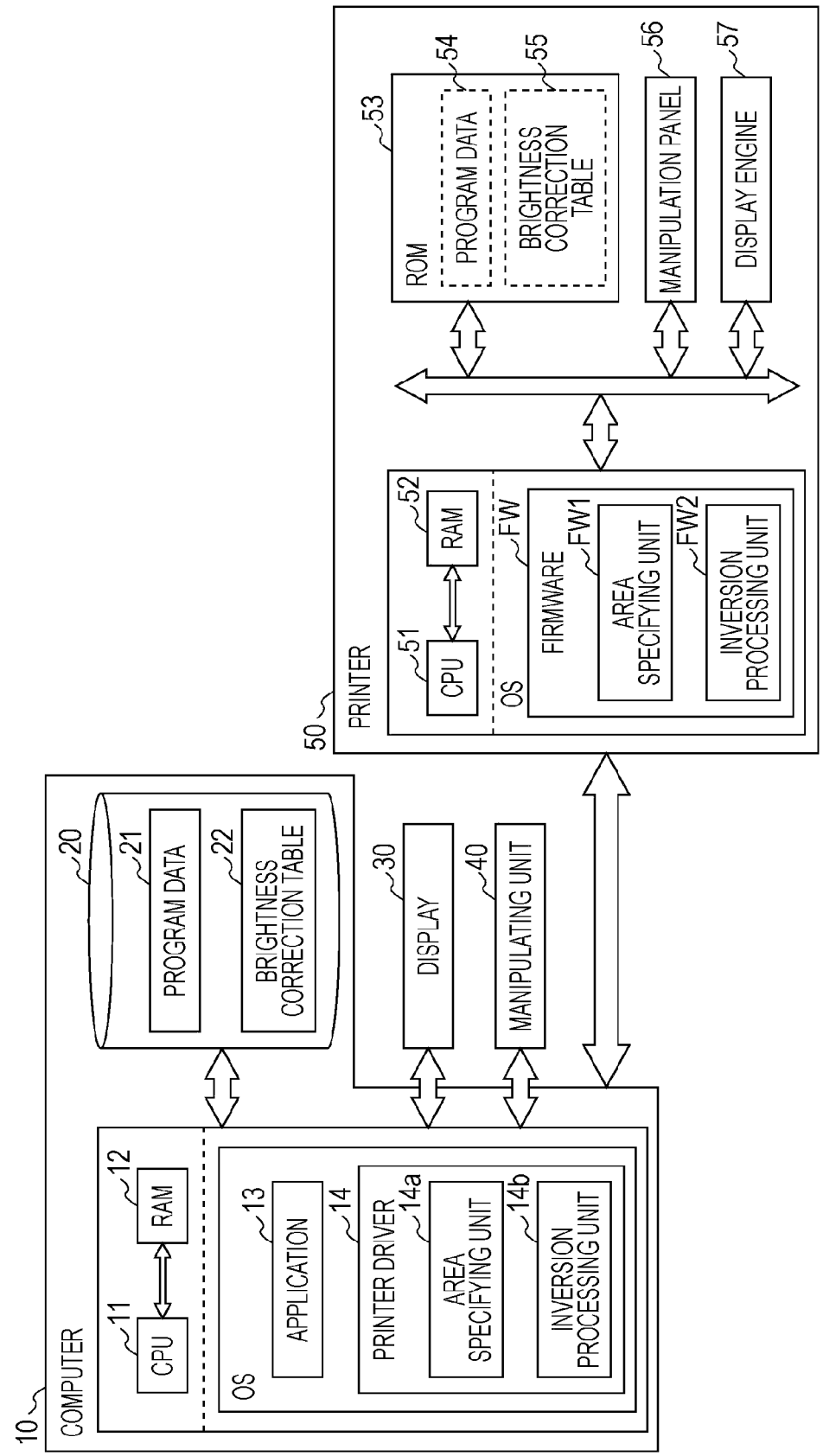
FIG. 1 is a diagram schematically showing an apparatus configuration according to a first embodiment.

Embodiments of the present disclosure will be described according to the following order with reference to the accompanying drawings.
1. First Embodiment
2. Second Embodiment
3. Modified Example
1. First Embodiment FIG. 1 schematically shows an apparatus configuration according to the first embodiment. In FIG. 1, a computer 10 and a printer 50 are shown as PC. The computer 10 and/or printer 50 correspond to an image processing apparatus. In addition, the computer 10 and the printer 50, or the printer 50, also correspond to a printing device. In the computer 10, a CPU 11 develops program data 21 stored in a storage unit such as a hard disk drive (HDD) 20 in RAM 12 and performs an operation according to the program data 21 under an OS, and an application 13 for word processing or a printer driver 14 for controlling the printer 50 is executed. The printer driver 14 is a program for executing each function of an area specifying unit 14a, an inversion processing unit 14b or the like in the CPU 11.

A display 30 serving as a display unit connects to the computer 10, and a user interface (UI) screen necessary for each processing is displayed thereon. In addition, a manipulation unit 40, for example a keyboard, a mouse or the like, connects to the computer 10, and instructions necessary for each processing are input via the manipulation unit 40. In addition, the printer 50 connects to the computer 10.

In the printer 50, a CPU 51 develops program data 54 stored in a memory such as ROM 53 in RAM 52 and performs an operation according to the program data 54 under an OS, and a firmware FW for controlling the printer is executed. The firmware FW may also implement each function of an area specifying unit FW1, an inversion processing unit FW2 or the like. The printer 50 further includes a manipulation panel 56 and a printer engine 57. The printer engine 57 is a printing mechanism for printing a printing medium by using an ink (or, a recording material such as toner or the like, which is the same in the below), based on driving data output from the firmware FW. The manipulation panel 56 includes, for example, a display unit having a liquid crystal display or the like, a touch panel on the display unit, and various keys and buttons. The manipulation panel 56 receives an instruction from a user via the touch panel and other various keys and buttons, and suitably displays necessary data on the display unit.

FIG. 2 is a flowchart for illustrating processes according to the first embodiment. The corresponding processes are implemented by the function of the printer driver 14 and the function of the firmware FW.

In Step S200, the printer driver 14 generates printing work data showing a printing work according to a file representing an image to be output, provided from the application 13. The application 13 supplies the file representing the image to be printed to the printer driver 14 according to a voluntary printing instruction by a user through the manipulation unit 40 or the like. Regarding the pattern of the printing work data, various patterns may be adopted. For example, the printer driver 14 may generate printing work data described with PDL (Page Description Language), or printing work data represented by a predetermined painting command. Here, the printing work data is expressed as a painting command.

In Step S210, the area specifying unit 14a of the printer driver 14 interprets the painting command of the printing work data, and specifies a text area in an image represented by the printing work data. Here, the text area used herein means an area including a text with a black color and a background with a white. The painting command defines the attributes, areas, shapes, colors or the like of each object in a text document (text) included in an image or a CG or photograph image. For this reason, the area specifying unit 14a interprets the painting command as the printing work data, and if an object corresponding to the text area condition is present, the area specifying unit 14a specifies the object as a text area.

In Step S220, the inversion processing unit 14b of the printer driver 14 performs a process of inverting brightness of achromatic colors (white, black, gray) only for the specified text area. In text area, the color of the achromatic color is defined with a value representing its concentration (brightness) (for example, "0" means the darkest color (black), and "255" means the brightest color (white). Here, the inversion processing unit 14b inverts the value representing the concentration of the achromatic color. However, regarding a gray-level achromatic color (gray with a concentration of 1 to 254) configuring a text in the specified text area, the inversion processing unit 14b changes the color to be brighter than the case where the brightness is inverted.

Figure 3A:
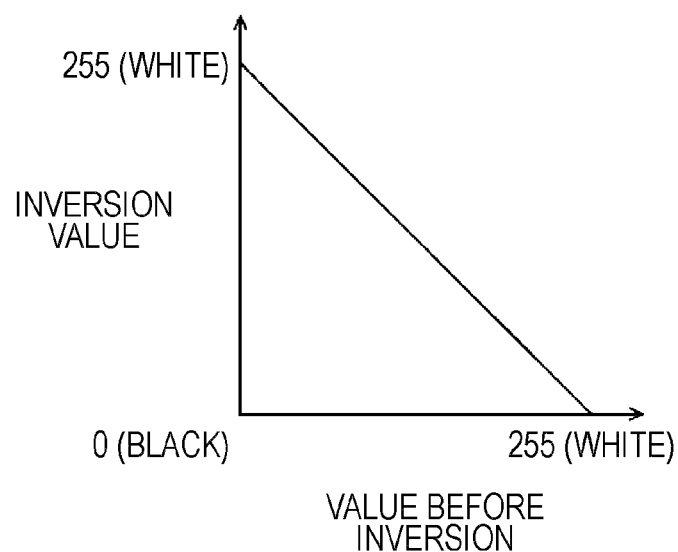
FIGS. 3A and 3B are diagrams for illustrating an inverting process.
Figure 3B:
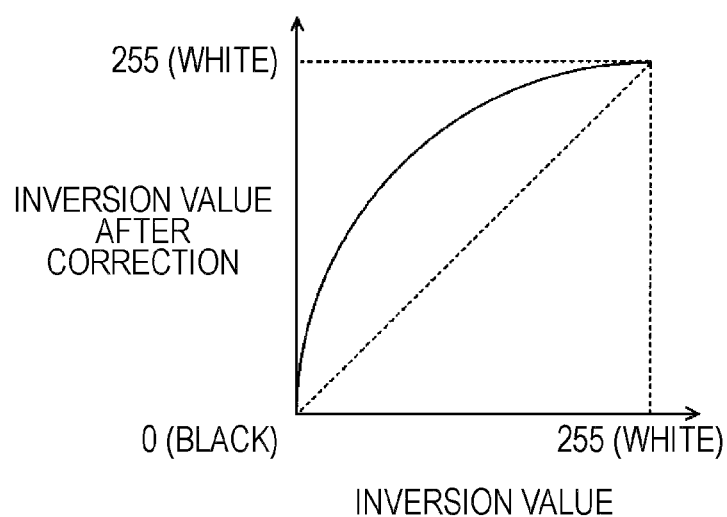

FIGS. 3A and 3B are diagrams for illustrating the inverting process of Step S220. In the specified text area, the concentration of the achromatic color is inverted according to a first degree function with a slope −1 expressed by FIG. 3A. Further, the value after inversion (inversion value) is corrected by a convex gamma curve at the upper side as shown in FIG. 3B, and thus becomes a corrected inversion value. FIG. 3B is an example of brightness correction tables 22 and 55, and is loaded in HDD 20 or the like in advance. According to the inversion and the correction of the inversion value, the black is converted into a white, and the white is converted into a black. In addition, a gray-level achromatic color is simply converted into a value brighter than the inversion value obtained by simply inverting its concentration. As a result of Step S220, in the painting command of the printing work data, the information defining the concentration of achromatic colors included in the text area may be revised according to each inversion value (the corrected inversion value regarding a gray-level achromatic color). In addition, the gamma curve shape as the brightness correction tables 22 and 55 has a symmetric shape, when compared based on a gamma curve for gradation correction and a first degree function with a slope 1 so that the brightness of black/white data is lowered for easier reading of a text when general black/white printing is performed.

In Step S230, the printer driver 14 interprets the printing work data (painting command), obtained by inverting the achromatic color of the text area in Step S220, and converts the data into raster data. The raster data is bitmap data expressing each pixel with a gradation value of a predetermined input surface color system (here, a RGB surface color system of red (R), green (G) and blue (B)).

In Step S240, the printer driver 14 performs color conversion with respect to the raster data by using a color conversion look-up table (LUT), not shown, loaded in HDD 20 or the like in advance. The color conversion LUT defines correspondence relations between the input surface color system (the RGB surface color system) and the output surface color system (an outside (surface) color system for the ink used by the printer engine 57) with respect to a plurality of input lattice points. For example, regarding the color conversion LUT, the amount (gradation value) of each ink, namely cyan (C), magenta (M), yellow (Y) and black (K), is defined as an output value which may correspond to each input lattice point. During the color conversion, interpolating operation or the like is performed as necessary. As a result, the raster data is converted into ink amount data having a gradation value for each of C, M, Y, and K of every pixel.

In Step S250, the printer driver 14 performs a halftone process with respect to ink amount data, and binary halftone defining whether a dot is formed or not formed is generated for every pixel of all kinds of ink. The halftone process is performed by a dithering method, an error diffusion method or the like. In addition, the halftone data is not limited to binary data, and may be, for example, quaternary defining whether a large dot is formed, a medium dot is formed, a small dot is formed, or no dot is formed, for every pixel of all kinds of ink. The large dot, medium dot and small dot represent plural kinds of dots whose ink amounts per dot dischargeable by a printing head 62 are relatively different. The ink amount per dot satisfies the following relation: large dot>medium dot>small dot.

In Step S260, the printer driver 14 converts the halftone data into driving data for driving the printer engine 57, and transmits the driving data to the printer 50. For example, in the case of a mechanism (ink jet printer) in which the printer engine 57 performs printing by main scanning of the printing head that ejects ink droplets (dots), the driving data where the information of every pixel of all kinds of ink is allocated is generated from the halftone data. To the driving data, each information necessary for printing of the printer 50 such as size of a printing medium, printing resolution, the number of printing sheets, layout during printing or the like are transmitted together.

As a result, in the printer 50, the firmware FW outputs the corresponding driving data to the printer engine 57, so that the printer engine 57 prints the image to be output (the image including the text area where achromatic colors are inverted) on a printing medium. Since printing may be performed by the function of the printer driver 14 or the firmware FW, it may be recognized that the computer 10 or the printer 50 has an output unit.

In addition, even though it has been described that the driving data is generated by the function of the printer driver 14, the processes in the flowchart of FIG. 2 may be partially or entirely implemented by the function of the firmware FW (at the printer 50 side).

For example, the printer driver 14 transmits the printing work data (painting command) after Step S220 to the printer 50. In the printer 50 receiving the printing work data, the firmware FW may perform the procedure after Step S230.

Further, the timing for specifying the text area and performing the inverting process is not limited to the above.

For example, it is possible for a text area to be specified and an inverting process be performed after the raster data is generated from the printing work data (painting command). In this case, the area specifying unit 14*a* of the printer driver 14 (or, the area specifying unit FW1 of the firmware FW) performs area determination (specifying the text area) with respect to the raster data. The area determination may be performed using various methods including known methods to, for example, detect the number of color kinds or the colors at every area, and it is possible to determine whether or not the area is a text area or to detect a spatial frequency of the image and specify a text area according to frequency characteristics.

In addition, if the text area is specified in the raster data, the inversion processing unit 14*b* of the printer driver 14 (or, the inversion processing unit FW2 of the firmware FW) inverts brightness of achromatic colors only for the specified text area. In this case, since each pixel has RGB gradation (0 to 255) for the raster data, in the specified text area, only for achromatic color pixels where R=G=B, the gradation value (=R=G=B) is inverted, so that, for the gradation value (1 to 254) of the gray-level achromatic color, the inversion value may be corrected according to the brightness correction table 22 (or, the brightness correction table 55). With respect to the raster data where the above inverting process is performed, a color conversion process or the like is performed.

In other cases, it is also possible for a text area to be specified and an inverting process be performed after the raster data is converted into ink amount data by the color conversion process. In this case, the area specifying unit 14*a* of the printer driver 14 (or, the area specifying unit FW1 of the firmware FW) performs area determination with respect to the ink amount data (specifying the text area). The area determination may be performed using various methods including known methods to, for example, detect the number of color kinds or the colors at every area, and it is possible to determine whether the area is a text area or not or to detect a spatial frequency of the image and specify a text area according to frequency characteristics.

In addition, if the text area is specified in the ink amount data, the inversion processing unit 14*b* of the printer driver 14 (or, the inversion processing unit FW2 of the firmware FW) inverts brightness of achromatic colors only for the specified text area. In this case, since each pixel has CMYK gradation (0 to 255) for the ink amount data, in the specified text area, only for white pixels (C=M=Y=K=0) and black/white or gray pixels (C=M=Y=0, 0<K≤255), the gradation value is inverted. The inversion value of a white pixel is set to be K=255, C=M=Y=0. In addition, the inversion value of a gray pixel is set so that only K has a value of 1 or above. In this case, for the gradation value of the gray pixel, the inversion value is corrected according to the brightness correction table 22 (or, the brightness correction table 55). With respect to the ink amount data where the above inverting process is performed, a halftone process or the like is performed.

FIG. 4 exemplarily shows an image printed on a printing medium p as a result of this embodiment. Here, it is assumed that the image to be output, provided from the application 13, includes a text area TA composed of a text document, a photograph area PA which is a photograph image, and a graphic area GA composed of a CG image. Among them, the photograph area PA and the graphic area GA are printed as they are without performing the inverting process. Meanwhile, with respect to the text area TA, the achromatic color is inverted, and a text portion (in FIG. 4, the text portion is simply depicted as a horizontal line) is displayed in white (white paper) so that the background of the text is printed with a black.

As described above, according to this embodiment, only the achromatic color in the text area TA of the image to be output is subject to the inverting process, so that the text displayed in black in the text area TA is displayed in white and the background displayed in white in the text area TA is displayed in black. For this reason, the burden on the eyes of a user who reads a text from the printing result may decrease. In addition, with respect to an area (the photograph area PA or the graphic area GA) other than the text area TA of the corresponding image or a color (chromatic color) other than the achromatic color in the text area TA, an image output result where the change is suppressed to the minimum is provided to the user so that the image is printed without color change.

The top portion of FIG. 5 shows a part of the text area TA in the printing result shown in FIG. 4. Here, an example where a text "K" is displayed in white with a background in black. In addition, the middle and lower portions of FIG. 5 show a part of the text "K" in an enlarged state. In the image to be output (data) provided from the application 13, in order to suppress jaggies at the border between the black text and the white background, a so-called anti-aliasing process is sometimes performed on a text, so that a pixel to which the anti-aliasing process is performed comes to have a gray level. The middle portion of FIG. 5 exemplarily shows the case where the achromatic colors (white, black, gray) in the text area are simply inverted according to their values. Meanwhile, the lower portion of FIG. 5 exemplarily shows the case where the inversion value with respect to the gray-level achromatic color in the text area is corrected according to the brightness correction table 22 (or, the brightness correction table 55) as described above. As found by the comparison between the middle and lower portions of FIG. 5, the brightness of the gray is corrected brighter by correcting the inversion value with respect to the gray-level achromatic color in the text area according to the brightness correction table 22 (or, the brightness correction table 55) as in this embodiment. For this reason, the inconvenience problem (difficulty in reading a text), caused by the fact that the text (white) looks thinner since the inversion value (gray) to which the anti-aliasing process has been performed mostly assimilates into the black background in appearance, may be solved.

2. Second Embodiment

Figure 6:
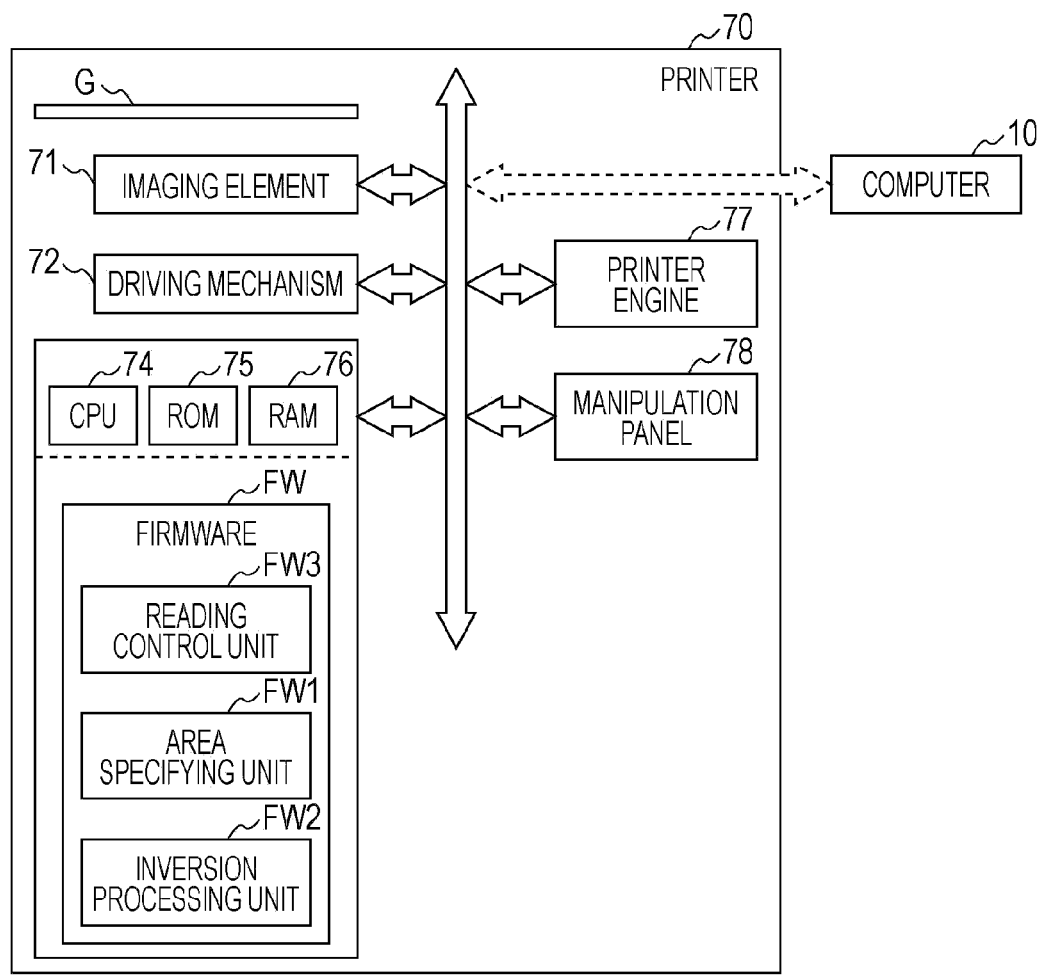
FIG. 6 is a diagram schematically showing an apparatus configuration according to a second embodiment.

FIG. 6 schematically shows configuration of a printer 70 according to the second embodiment. The printer 70 has a function (a scanning function) of reading a copy, not shown, placed on a platen G made of glass. In the case of the printer 70, an imaging element 71 is installed at the lower portion of the platen G. The imaging element 71 is, for example, a linear sensor having a plurality of pixels (light receiving elements) arranged in one direction (main scanning direction) of a readable range approximately corresponding to the range of the platen G, receives a reflected light irradiated to the copy from a light source, not shown, to experience photoelectric conversion and electric signal A/D conversion, and outputs a digital value (RGB value) of each pixel. In addition, the imaging element 71 may move in parallel to the platen G by a driving mechanism 72 in a direction (vertical scanning direction) perpendicular to the main scanning direction of the platen G.

The printer 70 includes a control unit for controlling each component of the printer 70. The control unit includes CPU 74, ROM 75, RAM 76 or the like, and the CPU 74 performs an operation according to the program data stored in the ROM 75 or the like by using the RAM 76 as a working area, and executes the firmware FW. The firmware FW may implement functions of, for example, a reading control unit FW3, an area specifying unit FW1, an inversion processing unit FW2 or the like. The printing device 70 further includes a printer engine 77, a manipulation panel 78 or the like. The printer engine 77 is a printing mechanism which performs printing on a printing medium based on the generated driving data. The manipulation panel 78 includes, for example, a display unit composed of a liquid crystal display or the like, a touch panel on the display unit, and various other keys or buttons. The manipulation panel 78 receives an instruction from a user via the touch panel and other various keys and buttons, and suitably displays necessary data on the display unit.

Figure 7:
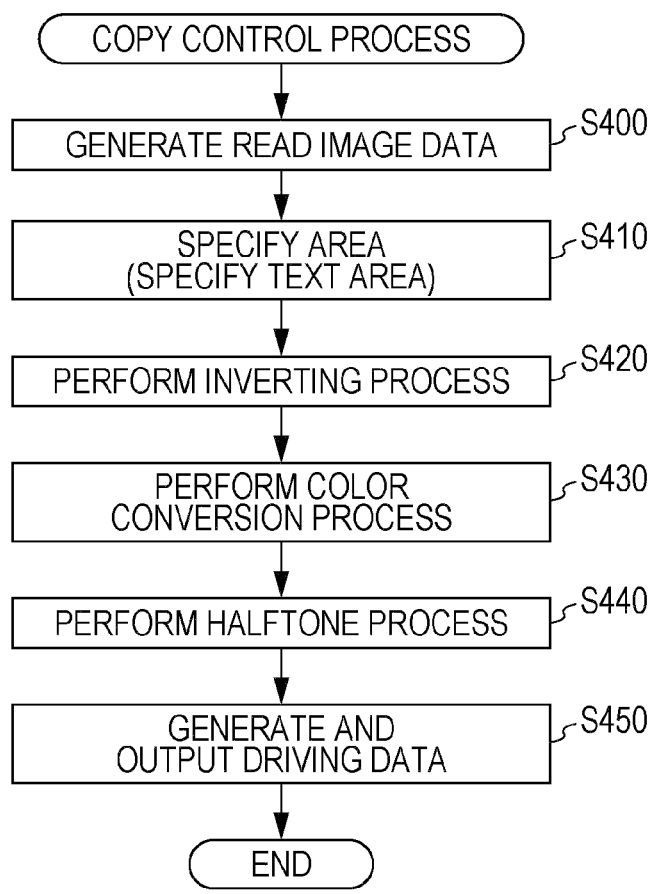
FIG. 7 is a flowchart for illustrating processes according to the second embodiment.

FIG. 7 is a flowchart for illustrating processes according to the second embodiment. The corresponding processes are performed by the firmware FW.

In Step S400, the reading control unit FW3 of the firmware FW controls the imaging element 71 and the driving mechanism 72, so that the imaging element 71 moves by the driving mechanism 72 and meanwhile the copy is read by the imaging element 71, and obtains read image data (raster data having a RGB gradation value of each pixel) as a result of reading the copy. The driving mechanism 72 includes a motor or carriage for moving the imaging element 71.

In Step S410, the area specifying unit FW1 performs area determination (specifying a text area) with respect to the raster data, as described in the first embodiment. In Step S420, the inversion processing unit FW2 inverts the brightness of the achromatic color only for the specified area with respect to the raster data (including a process of correcting the inversion value of the gray-level achromatic color according to the brightness correction table), as described in the first embodiment. Steps S430, S440, and S450 are identical to Steps S240, S250, and S260 of FIG. 2. As a result, in the printer 70, the firmware FW outputs the driving data to the printer engine 77, so that the image (the image including the text area obtained by inverting the achromatic color) represented on the copy is printed on the printing medium by the printer engine 77 (the copy is copied).

Since printing may be performed by the function of the firmware FW, it may be recognized that the printer 70 has an output unit. Even though it has been described that the process of FIG. 7 is implemented by a single printer 70 serving as a composite device, the process of FIG. 7 may also be implemented by a scanner corresponding to a configuration including the platen G, the imaging element 71 and the driving mechanism 72, a computer 10 connecting to the corresponding scanner and functioning corresponding to the firmware FW (the reading control unit FW3, the area specifying unit FW1, and the inversion processing unit FW2), and a printer connecting to the computer 10 to perform printing based on the driving data. In addition, the timing for specifying the text area and performing the inverting process is not limited to the timing shown in FIG. 7, but it is possible for a text area to be specified and an inverting process be performed after the raster data is converted into ink amount data by the color conversion process as in the first embodiment.

According to the second embodiment as above, in the image to be output (the image displayed on the copy), only the achromatic color in the text area is subject to the inverting process, so that the text displayed in black in the text area is displayed in white and the background displayed in white in the text area is displayed in black. For this reason, the burden on the eyes of a user who reads a text from the printing result may decrease. In addition, with respect to an area other than the text area of the corresponding image or a color other than the achromatic color in the text area, a copy result where the change is suppressed to the minimum is provided to the user so that the image is printed without color change. In addition, even though it has been described that the location of the copy is fixed so that the entire copy is scanned by moving the imaging element 71, it is also possible for the location of the imaging element 71 to be fixed so that the copy is scanned by carrying the copy in the vertical scanning direction.

3. Modified Example

The present disclosure is not limited to the above embodiments, but it can be implemented in various ways within the scope not departing from the spirit, and for example, the following modified example may be provided. Suitable combinations of each embodiment and the modified example are also included in the scope of the present disclosure.

In the case where an image including a text area where the brightness of achromatic colors is inverted is printed as described above, as being easily compared, it is also possible for an image including a text area before the brightness of achromatic colors is inverted to be printed on the same printing medium.

For example, on the premise of the first embodiment, in Step S230 (FIG. 2), the printer driver 14 (or, the firmware FW) interprets the printing work data (painting command), after the achromatic colors in the text area are inverted in Step S220, to convert the data into raster data (referred to as first raster data), and simultaneously interprets the printing work data (painting command) generated in Step S200 to convert the data into raster data (referred to as second raster data). In addition, the processes after Step S240 are performed on the first raster data and the second raster data.

In other cases, in the case where a text area is specified and an inverting process is performed after raster data is generated, the printer driver 14 (or, the firmware FW) performs the color conversion process (Step S240) to the raster data after inversion and the raster data before a text area is specified and the inverting process is performed, and the processes after Step S250 are performed on two kinds of obtained ink amount data. In other cases, in the case where a text area is specified and the inverting process is performed after the raster data is converted into ink amount data by the color conversion process, the printer driver 14 (or, the firmware FW) performs the halftone process (Step S250) to the ink amount data after inversion and the ink amount data before a text area is specified and the inverting process is performed. In addition, the driving data generated in Step S260 becomes data defining a layout or size of the image to be printed by the printer 50 on a printing medium. The layout or size used herein corresponds to a layout or size during printing on both sides of a printing medium or a layout or size during a so-called 2-in-1 printing where two images are printed on the same surface of a printing medium.

Figure 8:
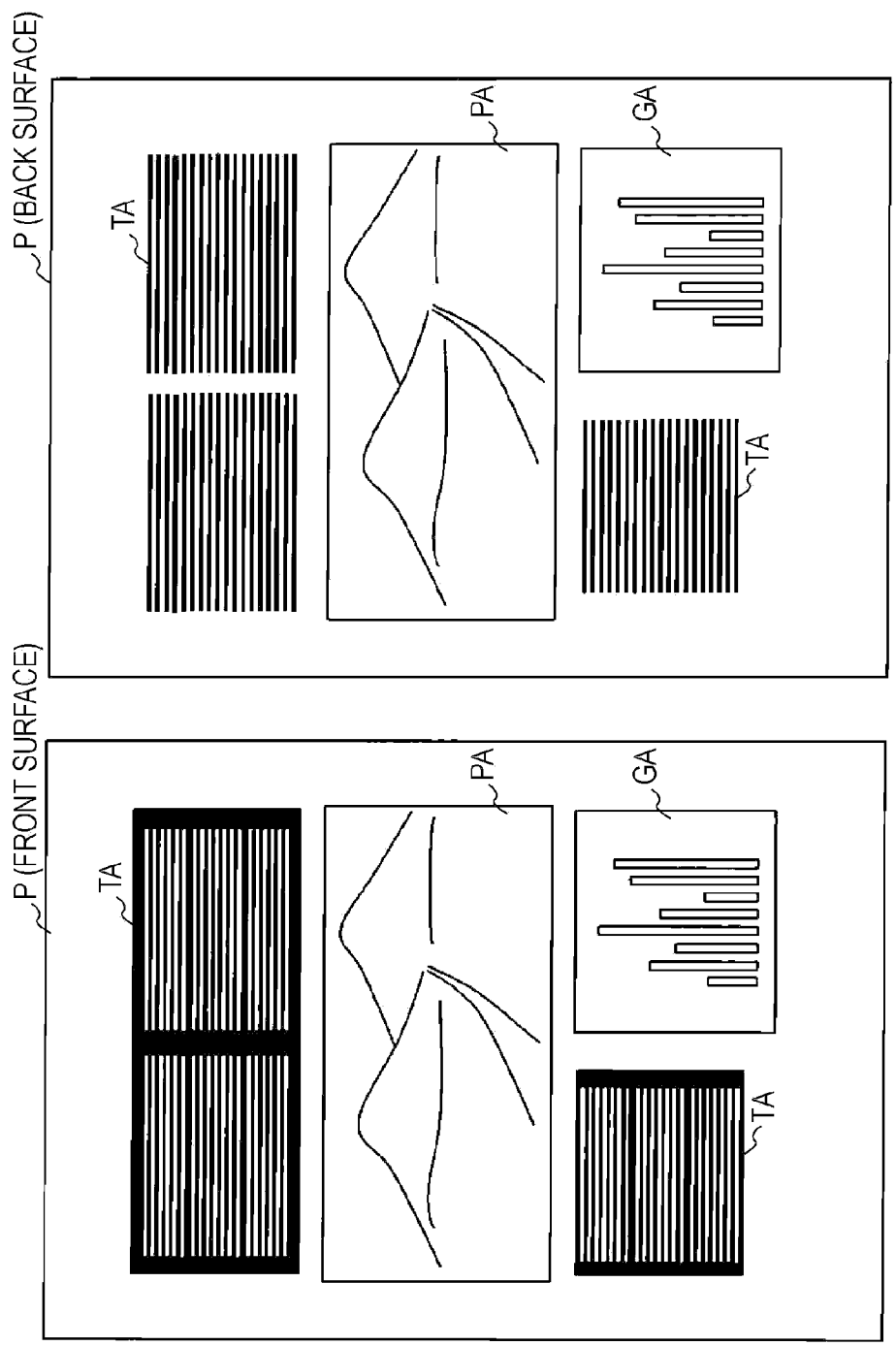
FIG. 8 is a diagram showing an example of a printing result according to a modified example.

FIG. 8 exemplarily shows a printing result performed on one sheet of printing medium P according to this modified example. In FIG. 8, an image to be output provided from the application 13 and an image (referred to as an inversion-containing image) including a text area TA where the brightness of the achromatic color is inverted are printed on one surface of a printing medium P, and an image to be output provided from the application 13 and an image (referred to as a general image) on which the inverting process is never performed are printed on the other surface of the printing medium P. According to the modified example, a user may comfortably read the text area TA by viewing both surfaces of the printing medium P and also recognize the original color and atmosphere of the entire image including the text area TA.

Figure 9:
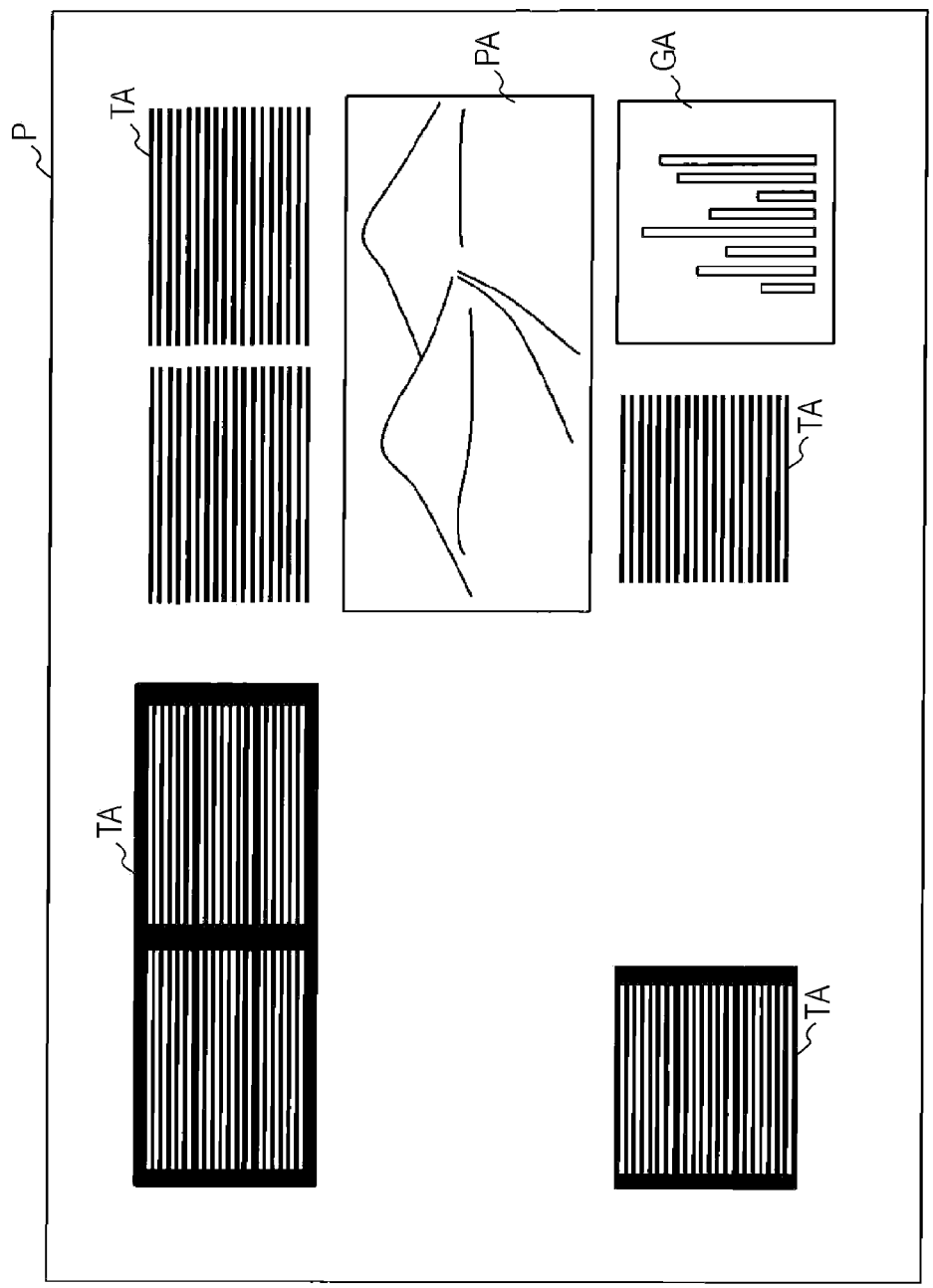
FIG. 9 is a diagram showing another example of a printing result according to a modified example.

FIG. 9 shows another example of the printing result performed on one sheet of printing medium P according to this modified example. In FIG. 9, an inversion-containing image and a general image are printed on the same surface of the printing medium P in a 2-in-1 method. In this example, a user may comfortably read the text area TA by viewing only one surface of the printing medium P and also recognize the original color and atmosphere of the entire image including the text area TA. However, in the example of FIG. 9, only the text area TA is printed as the inversion-containing image. In other words, when comparing the inversion-containing image and the general image on the same surface of the printing medium P, the region other than the text area TA is entirely identical, and therefore, in order to reduce ink consumption or printing time, the printer driver 14 (or, the firmware FW) does not print objects other than the text area TA in the inversion-containing image in the case of 2-in-1 printing (the ink amount data is set to be 0). In addition, the text area TA in the inversion-containing image may not be recognized as being printed only with achromatic colors. If a chromatic text is included in the text area TA with regard to the image to be output provided from the application 13, the chromatic text is printed with its color as a part of the text area TA.

Regarding the configuration on the premise of the second embodiment, an image obtained by just reading a copy and an image including a text area TA where the brightness of achromatic colors is inverted, and an image obtained by just reading a copy and an image to which the inverting process is never performed may be printed on a single printing medium P as exemplarily shown in FIG. 8 or 9.

In the above, in the case where an image including a text area TA where the brightness of achromatic colors is inverted is output, it generally means that the corresponding image is printed on a printing medium. However, outputting an image also includes a process of displaying the image on a predetermined display unit (the display 30 or the like), in addition to printing.

The entire disclosure of Japanese Patent Application No. 2011-061311, filed Mar. 18, 2011 is expressly incorporated by reference herein.

What is claimed is:

1. An image processing apparatus, comprising:
an area specifying unit that specifies a text area including a text with an achromatic color and a background with an achromatic color, in an image to be output;
an inversion processing unit that inverts the brightness of the achromatic colors only for the specified text area; and
an output unit that outputs is an image including the text area where the brightness of achromatic colors is inverted, where the output unit prints an image including the text area where the brightness of the achromatic colors is inverted.

2. The image processing apparatus according to claim 1, wherein with respect to a gray-level achromatic color configuring a text in the text area, the inversion processing unit changes the color to be brighter than the case where the brightness is inverted.

3. The image processing apparatus according to claim 2, wherein:
with respect to a black achromatic color configuring a text in the text area, the inversion processing unit changes the color to white, and
with respect to a white achromatic color configuring a text in the text area, the inversion processing unit changes the color to black.

4. The image processing apparatus according to claim 1, wherein the output unit prints the image including the text area where the brightness of the achromatic colors in the image is inverted and an image including a text area before the brightness of achromatic colors is inverted, on a single printing medium.

5. The image processing apparatus according to claim 4, wherein the output unit prints the image including the text area where the brightness of achromatic colors is inverted and the image including a text area before the brightness of achromatic colors is inverted, on one surface and the other surface of a single printing medium.

6. The image processing apparatus according to claim 4, wherein, in the case where the image including the text area where the brightness of achromatic colors is inverted and an image including the text area before the brightness of achromatic colors is inverted are printed on the same surface of a single printing medium, the output unit prints only the text area as the image including the text area where the brightness of achromatic colors is inverted.

7. The image processing apparatus according to claim 1, further comprising a processor that executes the area specifying unit, the inversion processing unit, and the printing processing unit.

8. The image processing apparatus according to claim 1, further comprising a non-transitory medium having stored thereon a program that includes the area specifying unit, the inversion processing unit, and the output unit.

9. An image processing method, comprising:
  specifying a text area including a text with an achromatic color and a background with an achromatic color, in an image to be output;
  inverting the brightness of the achromatic colors only for the specified text area; and
  printing an image including the text area where the brightness of the achromatic colors is inverted.

10. A printing device, comprising:
  an area specifying unit that specifies a text area including a text with an achromatic color and a background with an achromatic color, in an image to be output;
  an inversion processing unit that inverts the brightness of the achromatic colors only for the specified text area; and
  a printing processing unit that prints an image including the text area where the brightness of the achromatic colors is inverted, on a printing medium.

11. The printing device according to claim 10, further comprising firmware that implements the area specifying unit, the inversion processing unit, and the printing processing unit.

* * * * *